United States Patent
Gross

(10) Patent No.: US 7,491,320 B2
(45) Date of Patent: Feb. 17, 2009

(54) MARINE VESSEL LIQUID STRAINER CLOGGING INDICATOR

(76) Inventor: Donald P. Gross, 7240 Standard Dr., Hanover, MD (US) 21076

( * ) Notice: Subject to any disclaimer, the term of this patent is extended or adjusted under 35 U.S.C. 154(b) by 544 days.

(21) Appl. No.: 11/101,756

(22) Filed: Apr. 8, 2005

(65) Prior Publication Data

US 2006/0226084 A1    Oct. 12, 2006

(51) Int. Cl.
*B01D 35/14312* (2006.01)
(52) U.S. Cl. .............. 210/87; 73/114.68; 73/861.79; 114/183 R; 123/41.15
(58) Field of Classification Search .............. 210/85, 210/87, 103, 106–108, 171, 416.1, 739; 73/118.1, 73/198, 861.353, 118.01, 114.68, 861.79, 73/861.87; 123/41.15; 700/271, 304; 114/183 R; 165/11.1, 119
See application file for complete search history.

(56) References Cited

U.S. PATENT DOCUMENTS

| | | | |
|---|---|---|---|
| 2,499,494 A | 3/1950 | Greer | |
| 3,793,997 A | 2/1974 | Banner | |
| 3,864,260 A | 2/1975 | Banner | |
| 3,914,994 A * | 10/1975 | Banner | 73/118.1 |
| 4,019,489 A | 4/1977 | Cartmill | |
| 4,061,571 A | 12/1977 | Banner | |
| 4,160,733 A | 7/1979 | Nelson | |
| 4,337,655 A * | 7/1982 | Sundstrom et al. | 73/861.03 |
| 4,598,278 A | 7/1986 | Ford | |
| 4,630,036 A | 12/1986 | Ford | |
| 5,007,286 A | 4/1991 | Malcolm et al. | |
| 5,123,369 A | 6/1992 | Gross | |
| 5,467,643 A | 11/1995 | Barnett et al. | |
| 5,643,019 A | 7/1997 | Barnett et al. | |
| 6,471,853 B1 * | 10/2002 | Moscaritolo | 210/85 |

* cited by examiner

*Primary Examiner*—Matthew O Savage
(74) *Attorney, Agent, or Firm*—Rankin, Hill & Clark LLP

(57) ABSTRACT

An apparatus and method for estimating blockage within a liquid strainer used in a marine vessel is provided. The apparatus includes a sensor for measuring the rate of liquid flow through the strainer and a sensor for measuring the operational speed of a device utilizing the strained liquid. The apparatus also includes a control panel and central processing unit configured to receive at least one measurement from the flow sensor and receive at least one measurement from the speed sensor. The central processing unit then compares the relationship of the measured liquid flow rate and measured device speed to a predetermined clean strainer reference relationship of liquid flow rate and device speed at an equivalent device speed to determine the degree of strainer blockage. Visible and audible indicators are actuated when blockage becomes excessive.

6 Claims, 4 Drawing Sheets

MARINE VESSEL LIQUID STRAINER CLOGGING INDICATOR

BACKGROUND OF THE INVENTION

Strainers have been used for years to remove solid contaminants from liquid streams. In marine vessels and in industrial applications, strainers protect components located downstream from the strainer, such as pumps, heat exchangers, vessel engines and other components. The degree of clogging or blockage in the strainer has traditionally been measured by visual observation or an indirect method such as observation of rising temperature within the marine vessel engine.

As the degree of clogging or blockage increases in a strainer, problems such as inadequate flow through the strainer or solids carry-through occur and pumps, engines and other equipment can overheat or be damaged. Vessels include increasingly more numerous components that require strained liquid streams, and each component system typically includes its own dedicated strainer. Therefore, it has become undesirable and difficult to rely on traditional methods of strainer maintenance. Because of the increased time and effort required to maintain a multiple strainer system, visual inspections may not be performed at recommended or required intervals.

What is desired is a strainer clogging or blockage indicator that continuously monitors a plurality of strainers, operates reliably with constant speed devices, variable speed devices, or with a combination of both, and instantly alerts the operator of blockage within any one of (or all of) the connected strainers before damage occurs, reducing the need for visual inspection of individual strainers.

BRIEF SUMMARY OF THE INVENTION

The present invention solves these and other problems in the prior art by providing an indicator that senses the degree of clogging in each individual strainer in a single or multiple strainer system by linking measurements of liquid flow through each strainer with the operating speed (RPM) of the downstream device (if the devices operate at variable speeds) utilizing the liquid. Flow and speed measurements are continuously compared to reference data for each strainer, compiled during calibration when the system is in an unclogged condition. The degree of variation from the reference parameters indicates the degree of clogging within a particular strainer.

In a preferred embodiment of the invention, an apparatus for estimating blockage within a liquid strainer in a marine vessel is provided and includes a sensor for measuring the rate of liquid flow through a strainer, or multiple sensors if a multiple strainer system is employed, a sensor for measuring the operating speed (RPM) of a device utilizing the liquid from the strainer, and a central processor able to receive the liquid flow rate and speed data, make a comparison to reference data representing an unclogged condition and provide an indication when an excessive amount of clogging occurs in any of the strainers in the system. Indicators are programmed to actuate at a preset level of clogging, or may be programmed to initiate a strainer basket cleaning cycle if coupled to a self-cleaning strainer, such as GROCO Hydromatic™ manufactured by GROCO of Hanover, Md.

These and other aspects of the invention are herein described in particularized detail with reference to the accompanying figures.

DETAILED DESCRIPTION OF THE INVENTION

Figure 1:
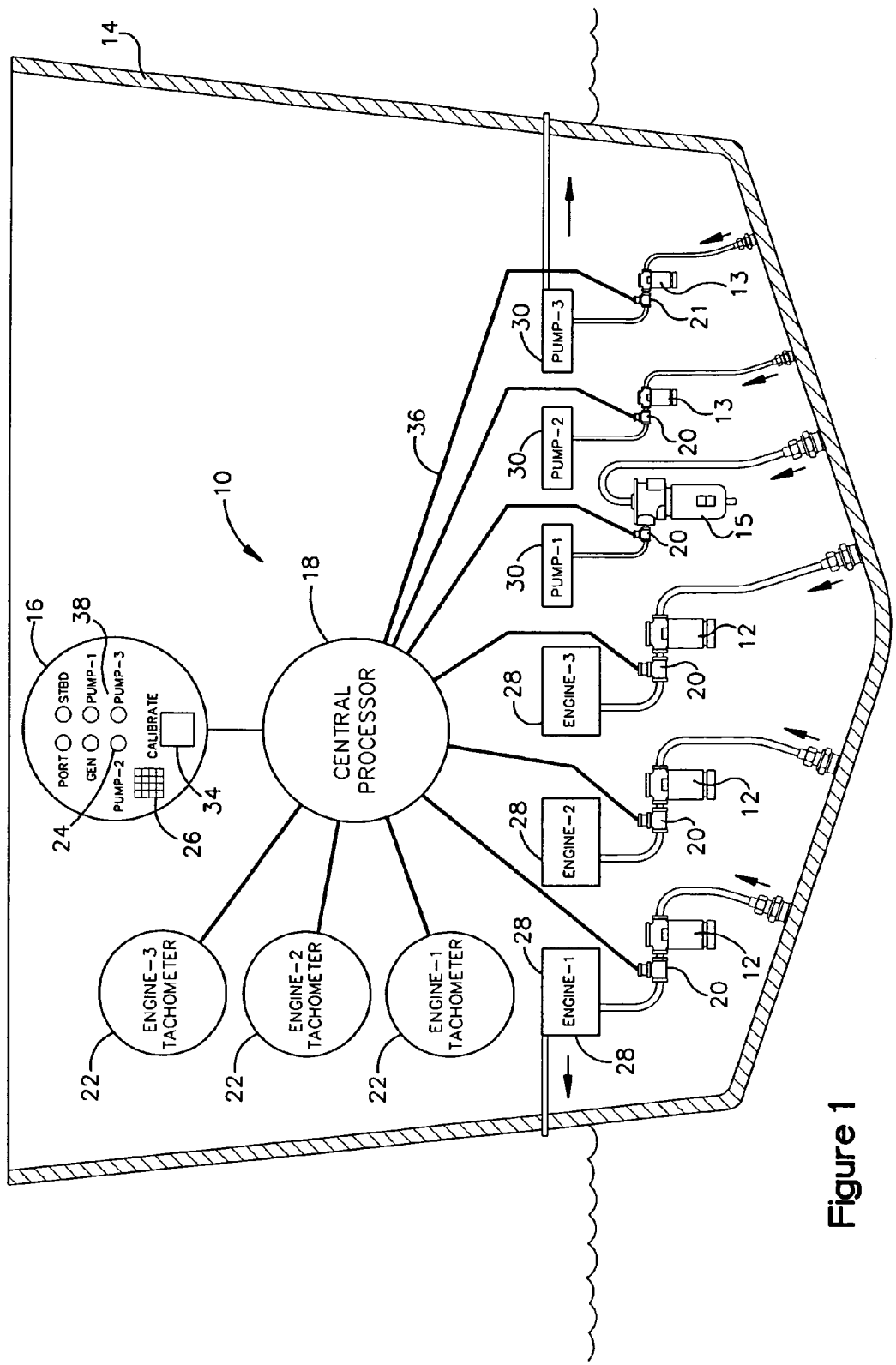
FIG. 1 is a schematic representation of an apparatus for estimating blockage within a strainer, or within multiple strainers, as part of a system on a marine vessel.

Referring to FIG. 1, a preferred apparatus 10 for estimating blockage within a liquid strainer 12 for a variable speed device, for a liquid strainer 13 for a constant speed device, or for a self-cleaning strainer 15 (which can operate with either a constant speed or variable speed device) is shown as part of a system within a marine vessel 14. As described in more detail below the apparatus 10 comprises a control panel 16, central processor 18, flow sensors 20, speed sensors 22, and visual and audible indicators 24 and 26 that warn of excessive blockage in the strainers 12, 13 and 15.

The marine vessel system is well known in the art and includes one or more variable speed engines 28 used for propulsion and/or to power the marine vessel 14 as well as one or more constant speed pumps 30 used to move liquid through generators, air conditioners, desalination units, and/or other vessel components. Each engine or pump operates either at constant speed or variable speed and utilizes liquid from a stream that passes through a strainer 12, 13 or 15 respectively. The strainer 12, 13 or 15 is of a type known in the art and conventionally comprises a cylindrical screen within a generally cylindrical housing. The present invention will work well with any strainer design or type.

The control panel 16 has a typical shape that fits within an instrument panel on a marine vessel 14, and houses the human-interface portion of the system (audible and visual indications 24 and 26 and an actuator 34 to put the control panel into calibration mode), while the central processor 18 is disposed at another location convenient to the connection of electrical wires from the flow sensors 20 and to the control panel 16. The central processor 18 includes a plurality of inputs 36 that are selectively placeable in electrical communication with the calibration actuator 34 on control panel 16, the flow sensors 20, the speed sensors 22, and outputs 38 that are in electrical communication with visible and audible blockage indicators 24 and 26. The visual indicators show when blockage in any of the connected strainers is at or above the programmed allowable level. Additionally, the electrical output from the visual and audible alarm indicators may be coupled through a relay to initiate operation of a self-cleaning strainer 15 such as GROCO Hydromatic™ manufactured by GROCO of Hanover, Md.

A liquid flow sensor 20 such as a rotameter is used to measure the liquid flow rate through the strainer 12 or 13 respectively. Other types of flow sensors known in the art may be used in place of a rotameter, for example a paddlewheel/magnet type flow sensor. The flow sensor 20 generates an electrical signal proportional to the flow rate. An operational speed sensor 22 such as a tachometer is used to measure the speed of the variable speed device that uses the strained liquid. The speed sensor 22 generates an electrical signal proportional to device speed, and preferably senses rotational speed of an engine 28.

The strainers 12, 13 and 15 are placed between water inlet ports on the marine vessel and components such as pumps 30, engines 28, heat exchangers, etc. utilizing strained liquid within the marine vessel 14. Liquid flow sensors 20 may be placed anywhere in the flow stream between the strainers 12, 13, and 15, and the devices that utilize strained liquid, but are typically placed directly after the strainers 12, 13 and 15. Flow sensors 20 are in electrical communication with the central processor 18. Speed sensors 22 are affixed to devices that operate at variable speeds and utilize the strained liquid and are electrically connected to central processor 18. Constant speed pumps 30 are electrically connected to central processor 18, but do not utilize a speed sensor. Central processor 18 is electrically connected to control panel 16.

The strainers 12, 13 and 15 remove solid particles from a liquid stream typically by using a screen or other filter media. Particles having a size larger than the mesh size of the screen cannot pass from an inlet side to an outlet side of the strainer 12, 13 or 15. The central processor 18 compares measured operational parameters to reference parameters to determine blockage in the strainer 12, 13 or 15 and communicates excessive blockage to control panel 16 where it is visually and audibly displayed. More specifically, the central processor 18 continually samples data from the liquid flow sensors 20 and from speed sensors 22. During calibration modes the central processor 18 creates a reference value (for a constant speed device—see FIG. 2) or a reference profile (for a variable speed device—see FIG. 3). During an operating mode the central processor 18 receives measurements from the liquid flow sensors 20, and from speed sensors 22, and compares the relationship of the measured liquid flow rate for strainers 12, 13 and 15 to the measured device speed for a device utilizing liquid from strainer 12, 13 or 15, and further compares the relationship value to that of a reference value measured during calibration at an equivalent speed. The central processor 18 controls the indicators 24 and 26 on the control panel 16 to alert the vessel operator when excessive strainer blockage occurs. The visual indicator 24 illuminates and the audible alarm 26 sounds when the flow through a specific strainer falls below a programmed allowable level. Alternately, the visual indicator 24 may have a series of staged lights that are incrementally illuminated to indicate the increasing degree of strainer blockage.

Each plumbing system is unique due to variations in pipe or hose type, diameter and length, and fittings used. The central processor 18 must be calibrated for each connected strainer 12, 13 or 15 with respect to said variations, and with respect to liquid flow and device speed measurements. Referring to FIG. 1, constant flow pumps 30 are calibrated with only liquid flow data received from flow sensors 20. Variable speed devices 28 are calibrated with liquid flow data from flow sensors 20 and with speed data from speed indicators 22.

In a constant speed system with a clean strainer 13 or 15, flow rate through the strainer 13 or 15 is also constant. Over time, as solid material that cannot pass through the strainer 13 or 15 builds up on the strainer 13 or 15 inlet side, the liquid flow rate through the strainer 13 or 15 is reduced. The amount of flow rate reduction is proportional to the blockage in the strainer 13 or 15.

Figure 2:
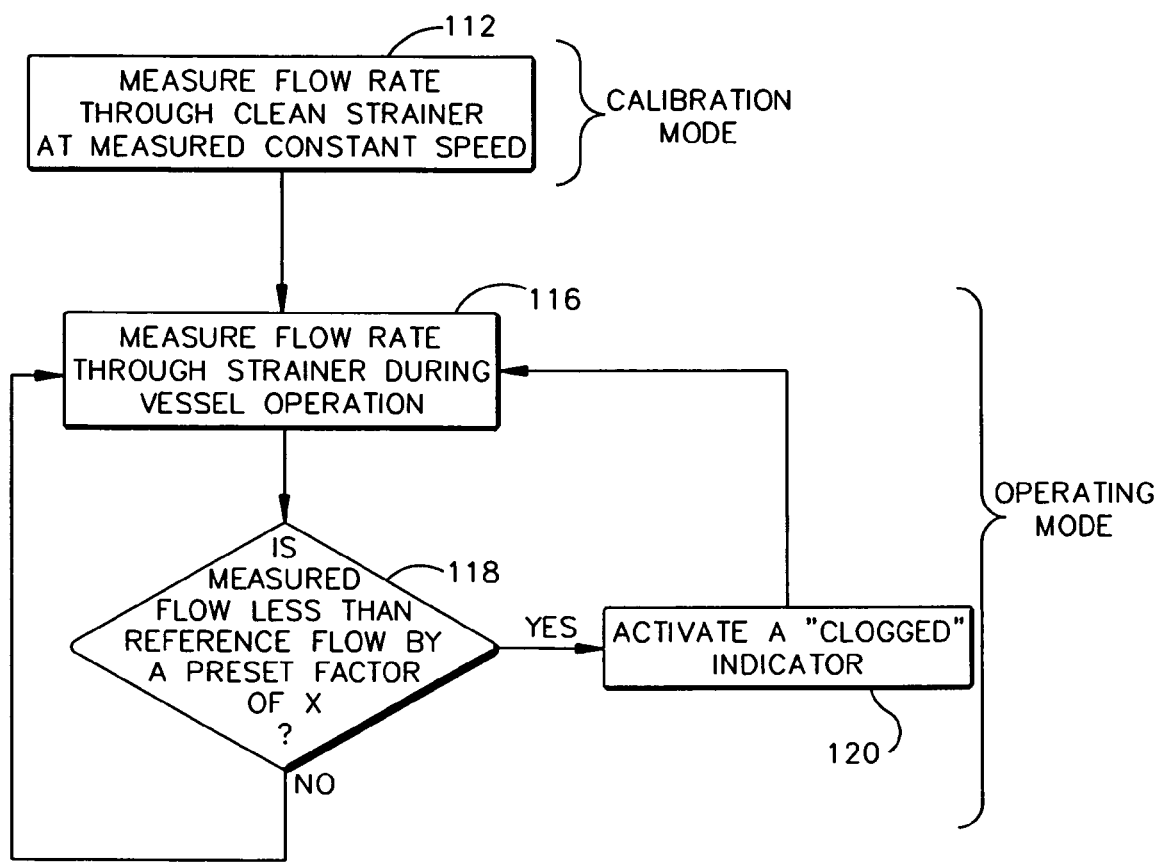
FIG. 2 is a flowchart indicating a method of estimating blockage within a strainer as part of a system on a marine vessel using a constant speed device utilizing strained liquid.

Referring to FIGS. 1 and 2, in a clean or completely unclogged state, the central processor 18 is calibrated with respect to the constant flow device 30 that receives the strained liquid from strainer 13 or 15. The actuator 34 upon the control panel 16 is pressed to place the central processor 18 into a calibration mode. A measurement of liquid flow 112 is made through a clean strainer 13 or 15. Because the device operates at a single speed only, a single calibration measurement is sufficient.

In a variable speed system with clean strainer 12 or 15, flow rate through the strainer 12 or 15 is generally proportional to the speed of device 28 as measured by speed indicator 22. Over time, as solid material that cannot pass through the strainer 12 or 15 builds up on the strainer 12 or 15 inlet side, the liquid flow rate at all speeds through the strainer 12 or 15 is reduced. The amount of flow rate reduction has greater negative affect upon system performance at higher device speed than at lower device speed due to relatively greater liquid flow rate at higher speed. The amount of flow rate reduction is generally proportional to the blockage in the strainer 12 or 15.

Figure 3:
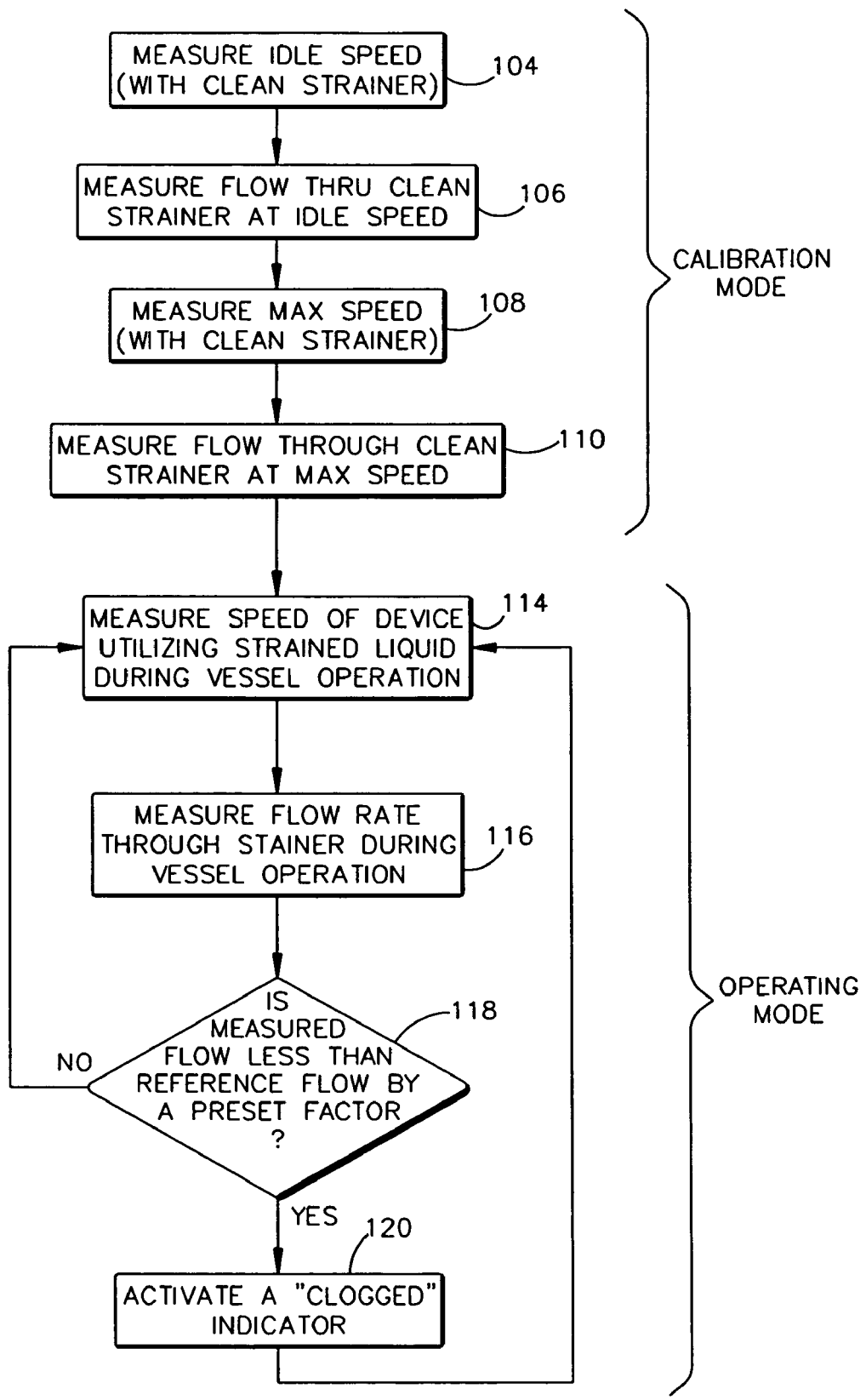
FIG. 3 is a flowchart indicating a method of estimating blockage with a strainer as part of a system on a marine vessel using a variable speed device utilizing strained liquid.

Referring to FIGS. 1 and 3, a measurement of speed 104 and flow 106 is made at an idle speed with a clean strainer 12 or 15, and a measurement of speed 108 and flow 110 is made at a maximum speed, also with a clean strainer 12 or 15. A linear estimation of liquid flow rate is made by the central processor 18 for operating speeds between idle and maximum speed. As such, calibration over the entire speed range of operation is made. The actuator 34 upon the control panel 16 is pressed again to take the central processor 18 out of calibration mode.

As the marine vessel 14 is in use, the apparatus 10 is continuously measuring both device operational speed 114 in variable speed devices 28, and liquid flow rate 116 in all devices. If the measured relationship deviates 118 beyond a predetermined degree from the reference relationship, an excessive blockage exists within the strainer 12, 13 or 15 and a blockage indicator 24 and 26 is actuated 120.

Figure 4:
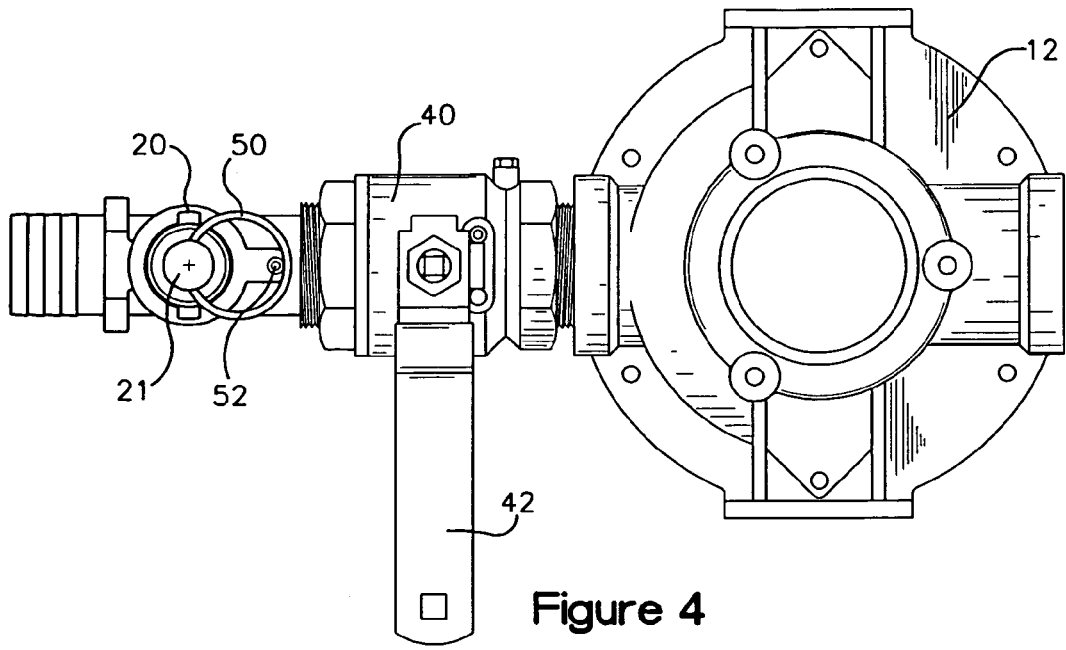
FIG. 4 is a top view of an alternate embodiment of a portion of the apparatus for estimating blockage within a strainer.
Figure 5:
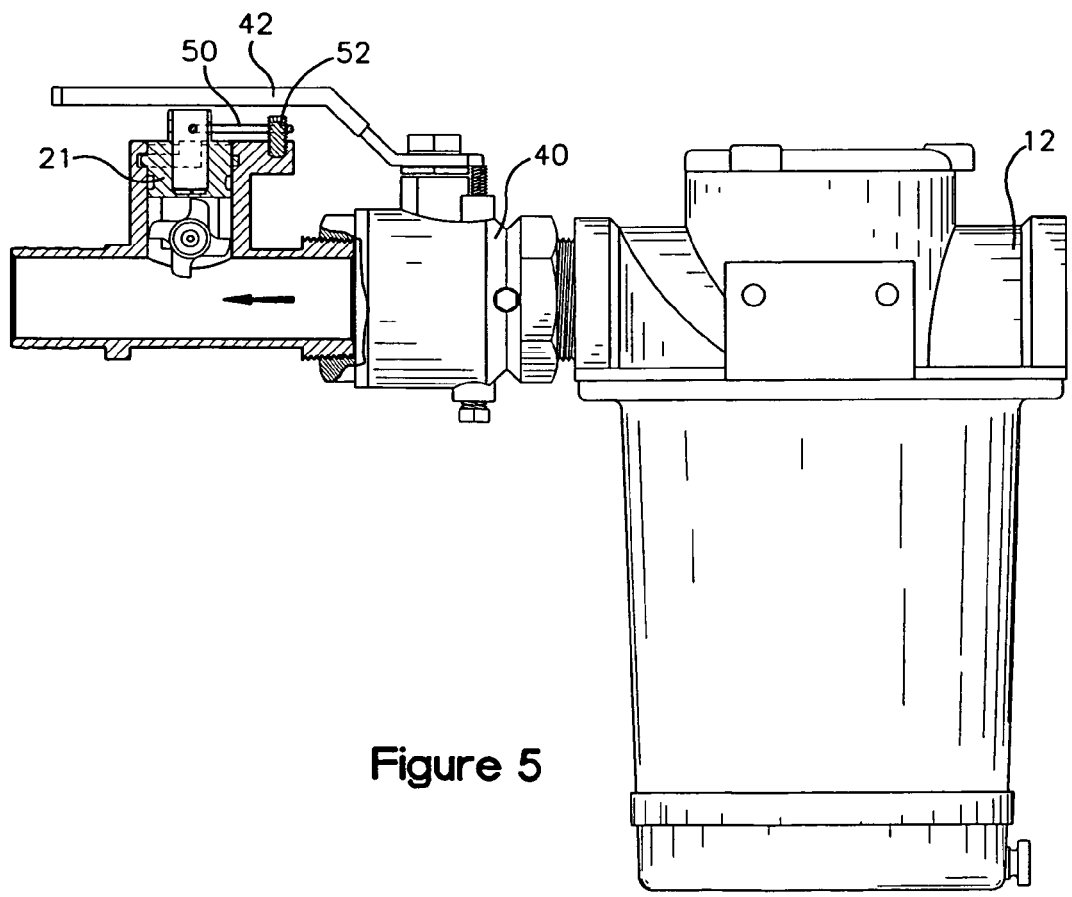
FIG. 5 is a side elevational view of an alternate embodiment of a portion of the apparatus for estimating blockage within a strainer.

Referring to FIGS. 1, 4 and 5, in an alternate embodiment of the invention, the apparatus 10 for estimating strainer blockage may additionally be used to clear water from a flooded vessel 14. A typical apparatus for cooling vessel components and clearing water from a flooded vessel is disclosed in U.S. Pat. No. 5,123,369 to Gross which is incorporated in its entirety herein.

Within the present apparatus, a valve 40 is positioned between the strainer 12 and the component being cooled. The valve 40 is located directly adjacent to the liquid flow sensor 20. The valve 40 is preferably a ball valve, but may be any type of valve that uses an extended arm handle 42 for actuation. When the valve 40 is in an open position, the handle 42 is positioned directly above the liquid flow sensor 20. When the valve 40 is in a closed position, the handle 42 is offset from a position directly above the liquid flow sensor 20. The flow sensor 20 includes a magnet/paddlewheel assembly 21 that is removable. However, the magnet/paddlewheel assembly 21 cannot be removed when the valve 40 is in an open position because of interference from the handle 42. When the magnet/paddlewheel assembly 21 is removed, direct access to the pipe or hose is provided. Direct access is available to the entire plumbing system for maintenance or the introduction of antifreeze for winterization. The magnet/paddlewheel assembly 21 is removed by rotating the magnet/paddlewheel assembly 21 ninety degrees, which moves the magnet/paddlewheel assembly 21 from a locked and operationally aligned position to an unlocked position. The magnet/paddlewheel assembly 21 is then simply pulled out of the flow sensor housing.

The flow sensor 20 includes a locking and pull ring 50 and set screw 52. The set screw 52 is attached to the housing of the flow sensor 20. The locking and pull ring 50 is attached to the magnet/paddlewheel assembly 21 and fits around the set screw 52 only when the magnet/paddlewheel assembly 21 is operationally aligned within the housing of the flow sensor 20. When the locking and pull ring 50 is over the set screw 52, the magnet/paddlewheel assembly 21 can not be rotated out of proper alignment.

When an instance occurs where the vessel 14 is flooded, for example to the waterline illustrated in FIG. 1, and extra bilge pumping capacity is required, the vessel operator closes the valve 40 in the apparatus 10. With the valve 40 closed, water can no longer be pumped into the apparatus directly from the sea. When the valve 40 is closed, the handle 42 is moved to a position allowing the magnet/paddlewheel assembly 21 to be removed. The locking and pull ring 50 is removed from over the set screw 52, the magnet/paddlewheel assembly 21 rotated and pulled out of the sensor housing. Water may then be pumped from the flooded vessel 14 through the opening within the flow sensor 20, through the components for cooling purposes, and then discharged outside of the vessel.

Although the valve 40 is located directly adjacent to the strainer 12 and flow sensor 20 in the embodiment described above, a valve 40 of any type may alternatively be located anywhere between the flow sensor 20 and the point where water enters the vessel 14 from the sea. In such an alternative configuration, the interference advantage provided by the valve handle 42 may be lost, but the ability to pump out water from inside the vessel 14 is not.

Although the strainer 12, 13 or 15 has been described as a screen, any type of strainer 12, 13 or 15 or filter that restricts liquid flow as it becomes clogged may be used such as a perforated ceramic, filter cloth, or magnetic filter. Although a single control panel 16 is illustrated for all of the strainers 12, 13 and 15 within the preferred marine vessel, multiple control panels 16, and multiple central processors 18 may be used. Central processor 18 is shown with six flow-rate inputs 36, and control panel 16 is shown with six visible indicators 24. Central processor 18 may be provided with inputs 36 for any number of strainers 12, 13 and 15 and control panel 16 may be provided with any number of visual indicators.

The predetermined threshold that represents an excessive amount of strainer clogging such that a visible and/or audible indicator is actuated may be set at any degree of flow reduction at a distinct operational speed and may be adjusted within the central processor 18. The actuator 34 is shown as part of the control panel 16, but may be located remotely at central processor 18 and in electrical communication with the control panel. A visual indicator 24 showing degrees of blockage using multiple lights may be substituted with a needle type indicator or digital indicator.

The apparatus of the present invention is an improvement over current practices because the operator is notified instantly when blockage occurs, regardless of operating speed, and visual observation of individual strainers is not required. Status of all strainers in a system may be observed looking at a single control panel, or at a small number of control panels 16. Additionally, visual or audible signaling alerts the vessel operator of a blockage situation of which they may not be aware. After initial installation of the apparatus, no further uncoupling of plumbing is required unless it is to clean a blocked strainer. In addition to the visual and audible indication of flow loss or reduction, the present invention will also immediately alert the system operator of broken plumbing, a blocked heat exchanger, or an inoperable pump impeller.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. An apparatus for estimating blockage within a liquid strainer used in a marine vessel comprising:
   a sensor for measuring a rate of liquid flow through a liquid strainer on a marine vessel;
   a sensor for measuring an operational speed of a device on a marine vessel that utilizes the strained liquid;
   a central processing unit configured to:
      receive at least one measurement from the liquid flow rate sensor;
      receive at least one measurement of operational speed from the operational speed sensor; and
      compare a relationship of the measured liquid flow rate and measured device speed to a predetermined reference relationship of liquid flow rate and device speed at an equivalent device speed to determine a degree of blockage in the liquid strainer
   and further comprising a removable magnet/paddlewheel assembly within the liquid flow sensor and a valve adjacent to the liquid flow sensor, wherein the magnet/paddlewheel assembly is not removable when a handle on the valve is oriented in a valve open position.

2. The apparatus of claim 1, further including a visual indicator to show when excessive blockage of the strainer occurs.

3. The apparatus of claim 1, further including an audible indicator to show when excessive blockage of the strainer occurs.

4. An apparatus for estimating blockage within a liquid strainer used in a marine vessel comprising:
   a sensor for measuring a rate of liquid flow through a liquid strainer on a marine vessel;
   a sensor for measuring an operational speed of a device on a marine vessel that utilizes the strained liquid;
   a central processing unit configured to:
      receive at least one measurement from the liquid flow rate sensor;
      receive at least one measurement of operational speed from the operational speed sensor; and
      compare a relationship of the measured liquid flow rate and measured device speed to a predetermined reference relationship of liquid flow rate and device speed at an equivalent device speed to determine a degree of blockage in the liquid strainer
   and further including a removable magnet/paddlewheel assembly within the liquid flow sensor and a locking and pull ring and set screw affixed to the flow sensor wherein the locking and pull ring may be engaged with the set screw to prevent rotation of the magnet/paddlewheel assembly whereby when the magnet/paddlewheel assembly is removed, the apparatus may be operated as part of a flooded bilge clearing system, as bilge water is pumped in through the sensor opening where the assembly was and then out of the vessel.

5. The apparatus of claim 4, further including a visual indicator to show when excessive blockage of the strainer occurs.

6. The apparatus of claim 4, further including an audible indicator to show when excessive blockage of the strainer occurs.

* * * * *